Figure 1:
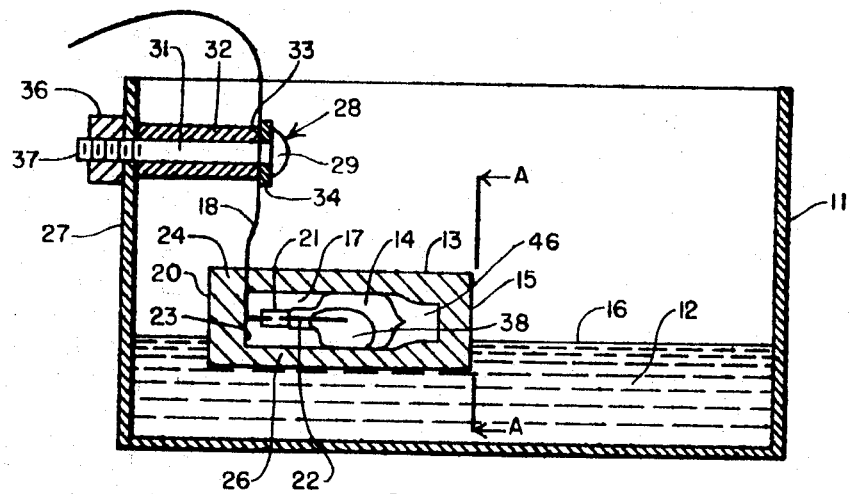

United States Patent
Leistiko

[15] 3,662,131
[45] May 9, 1972

[54] ELECTRICAL LIQUID LEVEL SENSOR
[72] Inventor: Frank T. Leistiko, 5230 Bloomington Avenue South, Minneapolis, Minn. 55417
[22] Filed: June 25, 1970
[21] Appl. No.: 49,880

[52] U.S. Cl. .........................200/84 R, 340/244 D, 174/17 R
[51] Int. Cl. ..........................................................G08b 21/00
[58] Field of Search .............340/244 B, 244 D; 73/313, 308; 200/84 R

[56] References Cited

UNITED STATES PATENTS 3,543,580  12/1970  McGill....................................73/313
3,155,956  11/1964  Hornbostel et al..................340/244 B
2,816,973  12/1957  Beck et al............................340/244 B

*Primary Examiner*—Thomas B. Habecker
*Attorney*—Harold D. Jastram

[57] ABSTRACT

An electrical liquid level sensor utilizing a mercury switch encased in a liquid-proof, low density thermoplastic case which floats on the surface of the liquid. The mercury switch is electrically connected through the low density case by flexible electrical conductors which act as a hinge.

8 Claims, 3 Drawing Figures

INVENTOR.
FRANK T. LEISTIKO

ELECTRICAL LIQUID LEVEL SENSOR

Sensors adapted to detect the level of liquids in vessels are wellknown in the art and take many forms. For example, electrical sensors or switches are used to detect water level in cooperation with sump pumps. These electrical switches are typically constructed utilizing levers and hinges made from wire and metallic parts. These metallic parts, due to the corrosive action of water and minerals dissolved in water, frequently become corroded and fail to work because of such corrosive action. Furthermore, these switches tend to be insensitive to liquid level after the switches have been used in such an environment and have become corroded.

Other types of switches are used in corrosive environments such as tanks utilized for developing photographic film. These switches, naturally, are corroded by the concentrated developing fluids used in the photographic process and, accordingly, tend to destroy the electrical conductors, mechanical working parts, and functioning parts of any electrical sensors brought in contact with such a corrosive environment.

Accordingly, it is an object of the present invention to provide a new and improved electrical liquid level sensor which is adapted to function in a corrosive atmosphere.

It is a further object of the present invention to provide a new and improved electrical liquid level sensor utilizing electrical conductors as a hinge and interconnecting a floating unit with a vessel wall.

It is a further object of the present invention to provide a new and improved electrical liquid level sensor adapted to function in a corrosive atmosphere and utilizing a thermoplastic encapsulated mercury switch for detecting the level of a liquid in a vessel.

A preferred embodiment of the invention utilizes a thermoplastic encapsulated mercury switch which is adapted to float on the surface of a liquid. The thermoplastic case is connected to a vessel wall by an insulator and electrical conductors which are connected to the mercury switch. The electrical conductors act as flexible hinges to suspend the case and mercury switch in the tank.

Figure 3:
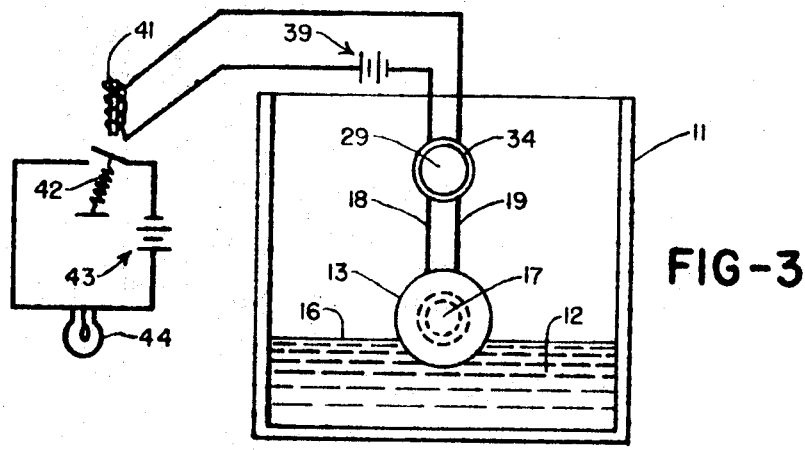
Figure 2:
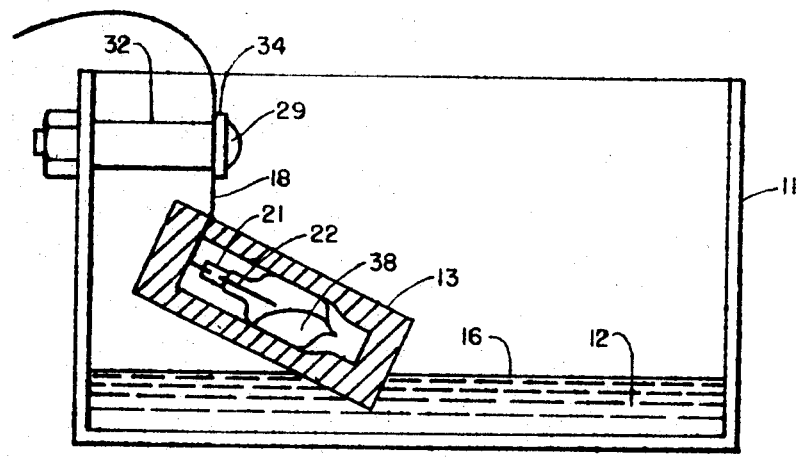

A more complete understanding of the invention can be achieved by reference to the drawings in which:

FIG. 1 is a cross-sectional view of a vessel containing a liquid and illustrating a sensor floating on the surface of the liquid, FIG. 2 is a cross-section of a vessel containing liquid in which the liquid level has dropped below a prescribed level and FIG. 3 is a right end view in cross-section of FIG. 1 taken along line A—A of FIG. 1 of the drawings.

Refer first to FIG. 1 of the drawings. Liquid vessel 11 contains liquid 12 which is to be maintained at a prescribed level illustrated in FIG. 1. When the liquid 12 is at the prescribed level as shown in FIG. 1, a sensor case 13 containing a mercury switch 14 will float substantially horizontal on the surface 16 of the liquid 12. End 15 of case 13 will float slightly higher than end 20 of the case 13 as shown in FIG. 1. As the liquid level rises, case 13 rises also but conductors 18 and 19 exert a downward force immobilizing end 20 but allowing end 15 to continue to rise, thus tilting the case 13 which causes the mercury pool 14 to contact terminals 22.

The case 13 is capable of floating upon the surface 16 of the liquid 12 because the case is made of a light, low density thermoplastic such as a plastic from the polyolefin family of thermoplastics.

Preferably, the plastic used for case 13 is a foamed polyethylene. The plastic is utilized for the case 13 which must be capable of preventing fluid from leaking into the interior chamber 17 where a mercury switch 14 is located. To achieve the low density characteristics and to provide for liquid impervious characteristics, the cells of the foamed thermoplastic should be closed cells rather than the open cells which are characteristic of a sponge. These closed cells create the necessary buoyancy to support a rather heavy mercury switch 14. This foamed plastic also cushions the fragile mercury switch at all times during use, storage and shipment.

Electrical conductors 18 and 19, see FIG. 3 of the drawings, are connected by connectors 21 to the electrical terminals 22 of mercury switch 14. These electrical conductors 18 and 19 can be connected to the electrical terminals 22 by typical weld or solder connections. However, a preferred method of connecting the electrical conductors 18 and 19 to the electrical terminals 22 is by friction or crimp receptacles specially designed for such electrical connections. These electrical receptacles or connectors 21 provide for easy assembly of the entire electrical sensor.

The chamber 17 in case 13 is open at one end of the case 13 as illustrated by end 23 of FIG. 1 of the drawings. A cap 24 is attached to the end 23 of case 13 by application of heat to the thermoplastic material of the cap 24 and/or case 13. The thermoplastic material softens or melts and contact of the cap 24 with the case 13 forms a weld 26 which entraps the electrical conductors 18 and 19. The conductors 18 and 19 are thereby mechanically immobilized by the thermal weld 26 to prevent the electrical conductors 18 and 19 from being pulled away from the electrical terminals 22 of mercury switch 14.

In a preferred embodiment of the invention, the electrical conductors 18 and 19 are entrapped by cap 24 between the cap 24 and case 13 so that the conductors are immobilized at a right angle to the axis of the terminals 22. This prevents the conductors 18 and 19 from being easily pulled or dislodged from the connector 21 and/or the electrical terminals 22. This insures a sturdy construction for the entire sensor unit and prevents easy destruction of the unit.

The electrical conductors 18 and 19 are connected to vessel wall 27 by an electrical insulator assembly 28. This electrical insulator assembly includes a bolt 29 which extends through the wall 27. The bolt 29 has threads 31 which screw into a plastic tube 32. The plastic tube 32 captures the electrical conductors 18 and 19 on either side of the bolt 29 between the end 33 of the tube 32 and a plastic washer 34.

A nut 36 is threaded to the end 37 of the bolt 29 thereby securely tightening the entire insulator assembly 28.

The length of electrical conductors 18 and 19 extending between the insulator assembly 28 and the case 13 is selected so that the level of the liquid changes only a prescribed distance before the mercury 38 in the mercury switch 14 is tipped away from terminals 22 as illustrated in FIG. 2 of the drawings, thus breaking the electrical terminal in the mercury switch. When the electrical terminals are no longer connected by the mercury pool 38, the electrical circuit illustrated in FIG. 3 is de-energized. The battery 39 no longer energizes coil 41. When coil 41 loses its magnetic field, the spring-biased switch 42 is closed and the battery 43 energizes a signal light 44 to indicate that the liquid level has dropped below a predetermined level.

The above electrical circuit arrangement utilizing a signal light 44 is merely illustrative of the type of circuit which might be utilized in order to use the unique characteristics of the present invention. For instance, light 44 might be a pump which is designed to pump fluid into the vessel 11 when the electrical sensor indicates a drop in the level of the liquid below a prescribed level.

After the liquid level of the vessel 11 is restored, the mercury pool again contacts the terminals 22 which in turn energizes the coil 41 and thereby terminates any further pumping action or extinguishes the signal light 44.

In a preferred embodiment of the sensor, the chamber 17 is formed by utilizing heat to shape the chamber. Application of heat on materials such as foamed polyethylene forms a skin on the interior surface subjected to the heat, thereby providing a very tough water or liquid impervious surface.

By forming the chamber 17 somewhat smaller than the mercury switch 14, the mercury switch must be forced into the chamber 17, thus insuring that mercury switch 14 will be securely held within the case 13. This compression of the chamber walls of chamber 17 is illustrated in FIG. 1 of the drawings where it is noted that the end 46 of the chamber 17 is somewhat smaller than the portion of the chamber immediately surrounding the mercury switch 14.

The electrical conductors 18 and 19 cannot be constructed from solid metallic conductors. The conductors 18 and 19 in this invention are utilized in a dual function of suspending the case 13 into contact with the surface 16 of the liquid 12 and also they act as a flexible hinge for the sensor. Conventional sensors must be mounted so that they remain plumb at all times to insure that their many mechanical linkages and levers will function as intended. If they are mounted out of plumb or the equipment on which they are mounted is moved out of plumb, they frequently fail to operate. The hinge formed by conductors 18 and 19 does not rely on an initial plumb mounting or maintenance of equipment in a plumb position. Therefore, conductors 18 and 19 must use multi-strand metallic conductors or wires to provide maximum flex in the conductors 18 and 19. These multi-strand electrical conductors must be as flexible as possible and, therefore, the insulating material is selected for maximum flexibility.

It will be observed that the use of conductors 18 and 19 provide shock resistance for the entire unit since the case 13 tends to float freely on the liquid surface 16 and is not subjected to extraneous mechanical shocks of any type. It is noted that the mercury switch 14 is completely encapsulated and removed from the corrosive atmosphere which might be encountered in the vessel 11. This prevents any likelihood of damage to the mercury switch 14. Since the case 13 is designed to float on the liquid 12, there is no appreciable mechanical strain applied to the conductors 18 and 19; the entire sensor unit is an extremely rugged corrosion-proof, destruction-proof unit. Further, it is noted that because of the lack of metallic parts in contact with the liquid 12, there is very little likelihood of any bacteria, fungus, or similar growth and deposits forming on the unit which would affect the operational capabilities of the unit.

Further, the switch due to its low density and therefore high buoyancy is insensitive to tilt and, in fact, tends to be self-leveling to a great degree. The leveling characteristics of the switch can be altered by merely shaping the case 13 in the fashion desired.

The above-described embodiments and drawings are merely illustrative of the principles of the present invention and are not meant to be limitations thereon. Many variations thereof may be achieved by those skilled in the art which are within the spirit and scope of the invention.

What is claimed is:

1. An electrical liquid level sensor for attachment to a liquid vessel which comprises a case having a hollow chamber and made from a thermoplastic, said chamber being open at one end, a mercury switch mounted within the chamber of said case, electrical conductors entering said chamber at the open end thereof, means for interconnecting the electrical conductors with electrical terminals of said mercury switch, a thermoplastic cap thermally welded to said case over the open end of the chamber to encapsulate said switch to prevent liquid passage into said chamber and to mechanically immobilize said electrical connectors, and an insulator for connecting said electrical conductors to said vessel, said electrical conductors constructed of electrically insulated multi-metallic strands for conducting electrical current and which conductors act as a flexible hinge interconnecting one end of said case and said insulator, said mercury switch and case forming a sensor unit with a density lower than the liquid in which the case is placed and said conductors interconnecting said case and insulator to suspend said case to tip said mercury switch and break electrical contact within said switch.

2. A sensor in accordance with claim 1 in which the electrical conductors are immobilized in said case at a right angle to the electrical terminals of said mercury switch.

3. A sensor in accordance with claim 1 in which said thermoplastic is selected from the family of thermoplastic polyolefins.

4. A sensor in accordance with claim 3 in which said polyolefin is polyethylene.

5. A sensor in accordance with claim 1 in which said thermoplastic is a foamed plastic having closed cells.

6. A sensor in accordance with claim 1 in which said means for interconnecting are friction connectors.

7. A sensor in accordance with claim 1 in which said chamber has a skin formed by heat forming the chamber.

8. A sensor in accordance with claim 5 in which the chamber and mercury switch are generally cylindrical and with the switch having a diameter slightly larger than said chamber, said switch being forced into said chamber to expand the chamber to firmly secure said switch in said chamber.

* * * * *